T. J. TRAPP.
Combined Union Couplings and Elbows.
No. 149,005. Patented March 24, 1874.
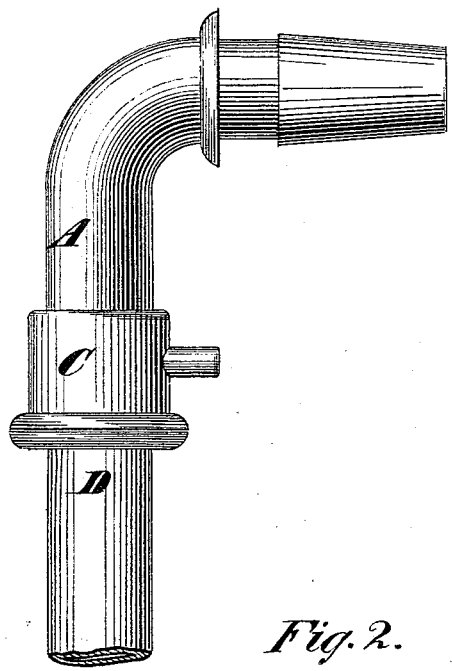
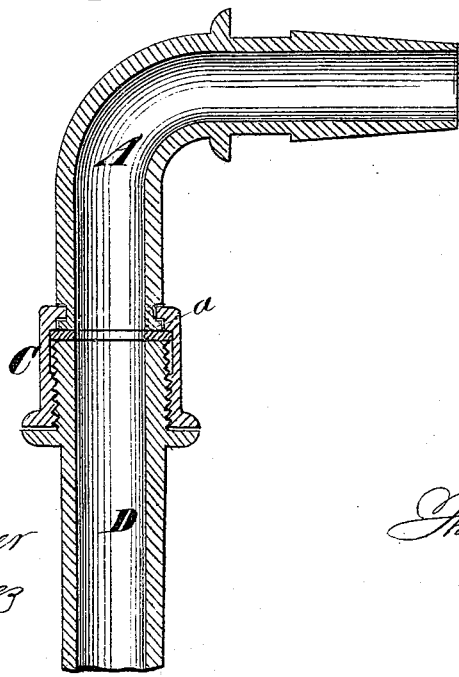

UNITED STATES PATENT OFFICE.

THOMAS J. TRAPP, OF WILLIAMSPORT, PENNSYLVANIA.

IMPROVEMENT IN COMBINED UNION-COUPLINGS AND ELBOWS.

Specification forming part of Letters Patent No. 149,005, dated March 24, 1874; application filed October 7, 1873.

*To all whom it may concern:*

Be it known that I, THOMAS J. TRAPP, of Williamsport, in the county of Lycoming and State of Pennsylvania, have invented a Combined Union-Coupling and Elbow, of which the following is a specification:

This invention is mainly designed to facilitate the coupling of hose to a street-hydrant or other water-conduit where a short bend has to be taken in the hose, but is applicable as a hose or pipe connection under other circumstances. It is intended, when applied for the purpose above mentioned, to obviate the contraction in hose-pipe which is consequent on too short a bend, and likewise to obviate the bursting of the pipe, which often occurs after the hose becomes weakened from repeated bending. It consists in the combination of an elbow and a union-coupling, the flange or collar of the union that retains the coupling-nut in place being formed directly on the end of the elbow, so that the hose is always in condition to be coupled with any hydrant or pipe that is furnished with a screwed nipple, or has its end screwed for the reception of the coupling-nut.

In the accompanying drawing, Figure 1 is a side view of the combined union-coupling and elbow, and Fig. 2 is a central longitudinal section of the same.

Similar letters of reference indicate corresponding parts in both figures.

A is the elbow, which, although represented of curved quadrantal shape, may be angular, and of varied length, to make a longer or shorter detour to suit the stream of water that is to flow through it. On one end it is formed to receive the end of the hose to be coupled, and on the other end there is a groove behind a flange or collar, *a*, and on this end the coupling-nut C is fitted, and is retained in place by the collar. The coupling-nut is internally screw-threaded in the usual way, and is furnished on its exterior with a pin-like projection, by which it can be conveniently turned to screw it onto the nipple on the hydrant or supply-pipe whence the water flows to the hose. This nipple is indicated in the drawing by the letter D. It is made so that it can readily be soldered to hydrants, or such pipes as hose is usually coupled to, and has a screw-threaded portion suitable to receive the coupling-nut. A hose thus coupled to its hydrant is free to swivel round, and, therefore, may the better sustain the various twistings which it may receive while in use.

In coupling hose to one of the common style of hydrants flush with the sidewalk, it has always been a difficult matter to prevent it from taking so short a bend as to cause it to contract and diminish the flow of water through it. Besides this, the pipe is rendered liable to be burst by the pressure of water on the part which is continually stretched in making the bend.

By this invention, I not only obviate the injury sustained by the pipe in its repeated bending, but I provide for the easy flow of water through the bend. The elbow being always on the pipe, it can be coupled in this improved manner to any water-pipe or other conduit that is furnished with a suitable nipple.

What I claim as my invention is—

The combined union-coupling and elbow, the flange or ring of the coupling that retains the nut in place being formed on the end of the elbow, substantially as herein set forth.

THOMAS J. TRAPP.

Witnesses:
  EDWIN H. BROWN,
  MICHAEL RYAN.